United States Patent
Hoddie et al.

(10) Patent No.: US 9,386,662 B1
(45) Date of Patent: Jul. 5, 2016

(54) METHOD AND APPARATUS FOR A CUSTOMIZABLE LIGHTING CONTROLLER

(71) Applicant: Marvell International Ltd., Hamilton (BM)

(72) Inventors: J. Peter Hoddie, Menlo Park, CA (US); Chris Krueger, Mill Valley, CA (US); Patrick Soquet, Chastre (BE); Andrew Jacob Carle, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/528,845

(22) Filed: Oct. 30, 2014

Related U.S. Application Data

(60) Provisional application No. 61/901,201, filed on Nov. 7, 2013.

(51) Int. Cl.
| | |
|---|---|
| *G05F 1/00* | (2006.01) |
| *H05B 37/02* | (2006.01) |
| *H05B 41/36* | (2006.01) |
| *H05B 39/04* | (2006.01) |

(52) U.S. Cl.
CPC ........ *H05B 37/0218* (2013.01); *H05B 37/0272* (2013.01)

(58) Field of Classification Search
None
See application file for complete search history.

(56) References Cited

U.S. PATENT DOCUMENTS

| | | | |
|---|---|---|---|
| 2006/0250745 A1* | 11/2006 | Butler et al. | 361/160 |
| 2014/0070706 A1* | 3/2014 | Fushimi | 315/131 |
| 2014/0265875 A1* | 9/2014 | Nelson et al. | 315/153 |

* cited by examiner

*Primary Examiner* — Anh Tran

(57) ABSTRACT

The present disclosure describes techniques and apparatuses for a customizable lighting controller. In some aspects a lighting controller is described that includes a display device to display selectable lighting functions, switches that each correspond to one of the selectable lighting functions, and a lighting controller manager to receive an input of a selectable lighting function at one of the switches of the lighting controller. The lighting controller manager can then initiate a display of the selected lighting level on the display device of the lighting controller. The lighting controller manager can also control a dimming module to set the selected lighting level.

21 Claims, 10 Drawing Sheets

METHOD AND APPARATUS FOR A CUSTOMIZABLE LIGHTING CONTROLLER

CROSS REFERENCE TO RELATED APPLICATIONS

This application claims priority under 35 U.S.C. §119(e) to U.S. Provisional Patent Application Ser. No. 61/901,201 filed Nov. 7, 2013, the disclosure of which is incorporated herein by reference.

BACKGROUND

Light switches have progressed from simple switches to include functions such as dimming and occupancy sensing, and further to integrate into home automation systems. Many home automation systems are expensive, and can be complicated for a consumer to install and/or program. For example, configuring a light switch to join a network of a home automation system may include removing switch plates to access and set configuration switches on the switch. The network in the home automation system may be limited in capability and connectivity, or exclusively dedicated to the home automation system. Connection to the home automation system from outside the home may require dedicated hardware to interface the home automation network to a home's broadband network.

Typically, the appearance of light switches and controllers is utilitarian and not dynamically customizable. For example, a consumer typically has a limited choice of colors when a light switch is purchased. The appearance (e.g., color) of the switch remains static throughout its service life and cannot be readily changed to enhance the décor of a room or to dynamically convey information beyond the basic indications of the switch's settings.

SUMMARY

This summary is provided to introduce subject matter that is further described below in the Detailed Description and Drawings. Accordingly, this Summary should not be considered to describe essential features nor used to limit the scope of the claimed subject matter.

A lighting controller is described that includes a display device to display selectable lighting functions, switches that each correspond to one of the selectable lighting functions, and a lighting controller manager to receive an input of a selectable lighting function at one of the switches of the lighting controller. The lighting controller manager can then initiate a display of the selected lighting level on the display device of the lighting controller. The lighting controller manager can also control a dimming module to set the selected lighting level.

A method is described for displaying selectable lighting functions on a display of a lighting controller. An input is received to select a lighting level at one of a plurality of switches of the lighting controller. In response to the received input, the selected lighting level is displayed on the display and a dimming module is controlled to set the selected lighting level.

A system is described that includes a lighting controller manager to display selectable lighting functions on a display device of a lighting controller. The lighting controller manager receives an input to select a lighting level from one switch of multiple switches that correspond to the selectable lighting functions. The lighting controller manager then displays the selected lighting level on the display device and controls a dimming module to set the selected lighting level.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Figure 1:
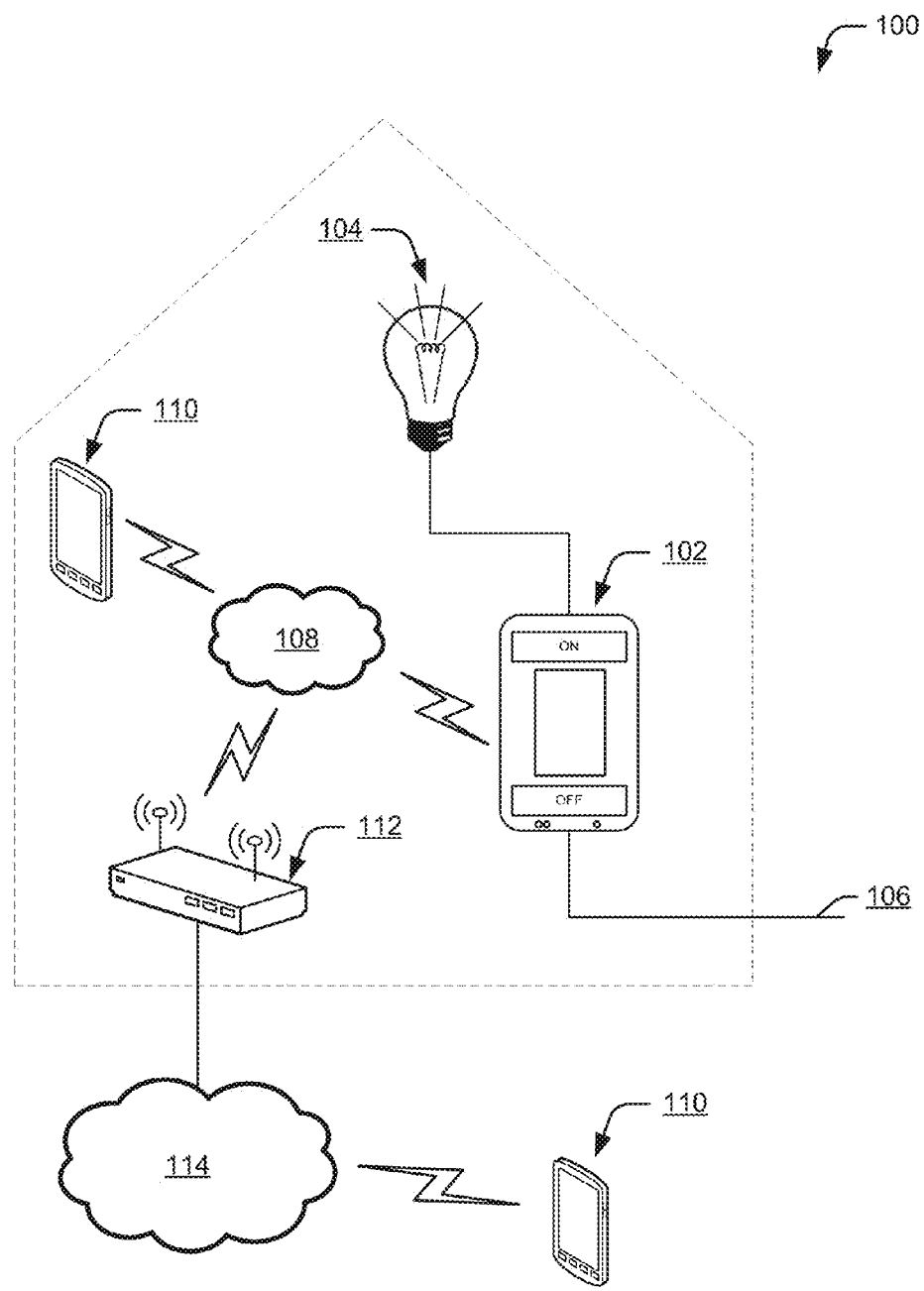
FIG. 1 illustrates an operating environment of the customizable lighting controller in accordance with one or more aspects.

Conventional lighting switches and controllers, whether stand-alone or connected to a home automation system, have very limited capability for customization. Including a network interface and a color display in a lighting controller enables a user to customize the appearance and functions of the lighting controller in a number of ways. The user can select and/or send content to the lighting controller to coordinate the lighting controller with the décor of a room in which the lighting controller is installed. The user can configure the lighting controller to run applications that obtain information over the Internet that is relevant to the user and schedule the information to be displayed at times that are useful for the user. In addition to using a companion device, such as a smartphone or tablet computer, to remotely control the lighting controller, the user can send images from the companion device to the lighting controller. The user can customize the lighting controller to animate transitions between images and/or other information.

Configuring conventional home automation lighting controllers may include removing switch plates, or even removing the lighting controller from an electrical box, to access configuration switches. By adding sensors, such as a proximity sensor, a light sensor, and/or a microphone, customization of the lighting controller can be further improved for the user. The lighting controller uses the proximity sensor to determine how close the user is to the lighting controller and/or whether there is motion in the vicinity of the lighting controller. The size of the display in the lighting controller is limited by the physical constraints of electrical boxes. The lighting controller adjusts the amount of information and/or the size of the information displayed on the display, based on the user's distance from the lighting controller. By considering user proximity, the lighting controller maximizes the amount of information that is displayed while maintaining readability of the information on the display at various distances.

Connecting a device to a network, such as a Wi-Fi network, may require entering network information to enable a network interface of the device to join and operate on the network. Conventional light switches and controllers have very limited user interface capabilities that make this process very challenging for the user. The companion device has a richer set of user interface capabilities, as well as being capable of communicating over one or more networks. The companion device encodes the network information from text into an audio signal. The user puts the lighting controller in a mode to setup its network connection, for example by using a simple sequence and/or combination of keystrokes on the lighting controller. The companion device then outputs the encoded audio signal from an audio speaker and the microphone of the lighting controller receives the audio signal. The lighting controller decodes the audio signal to obtain the textual network information to join the network. By so doing, network setup can be simplified without imposing lengthy, tedious, and/or error-prone user inputs at the lighting controller. By using an existing home Wi-Fi network, no new network infrastructure is need in the home for automation of lighting control.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

FIG. 1 illustrates an example operating environment 100 having a customizable lighting controller 102 connected to a lighting circuit 104. The appearance and functions of the customizable lighting controller 102 are configured as described above and below. The customizable lighting controller 102 is capable of setting a lighting level for the lighting circuit 104 and controlling a flow of electricity 106 to implement the lighting level that is set. The customizable lighting controller 102 is capable of communicating over a local network 108, such as a Wi-Fi network in a home, with a companion device 110. The companion device 110 may be any suitable computing device, such as a smartphone, a tablet computer, a notebook computer, a remote controller, and so forth. The local network 108 is managed by a local network router 112. The companion device 110 also communicates to the customizable lighting controller 102 over a wide area network 114 when the user is away from home. The local network 108 may be any suitable type of wireless or wired communication link, or any suitable combination thereof. For example, the local network 108 may be implemented in whole or part as a wireless local area network (WLAN), ad-hoc WLAN, infrastructure WLAN, wireless mesh network, wireless personal area network (WPAN), short-range wireless network, or power line network. The wide area network 114 may be any suitable type of wired and/or wireless network communications link such as cellular, mobile, or fixed wireless broadband.

The customizable lighting controller 102 provides lighting capabilities for the lighting circuit 104 including switching on/off, dimming, programming, and running lighting schedules, monitoring usage of the lighting circuit 104, and remote control from the companion device 110. The customizable lighting controller 102 stores and executes applications that customize the capability of the customizable lighting controller 102, including applications that send and receive information over the local network 108 and/or the wide area network 114. The applications may be related to lighting control or may provide useful information to the user.

Figure 2:
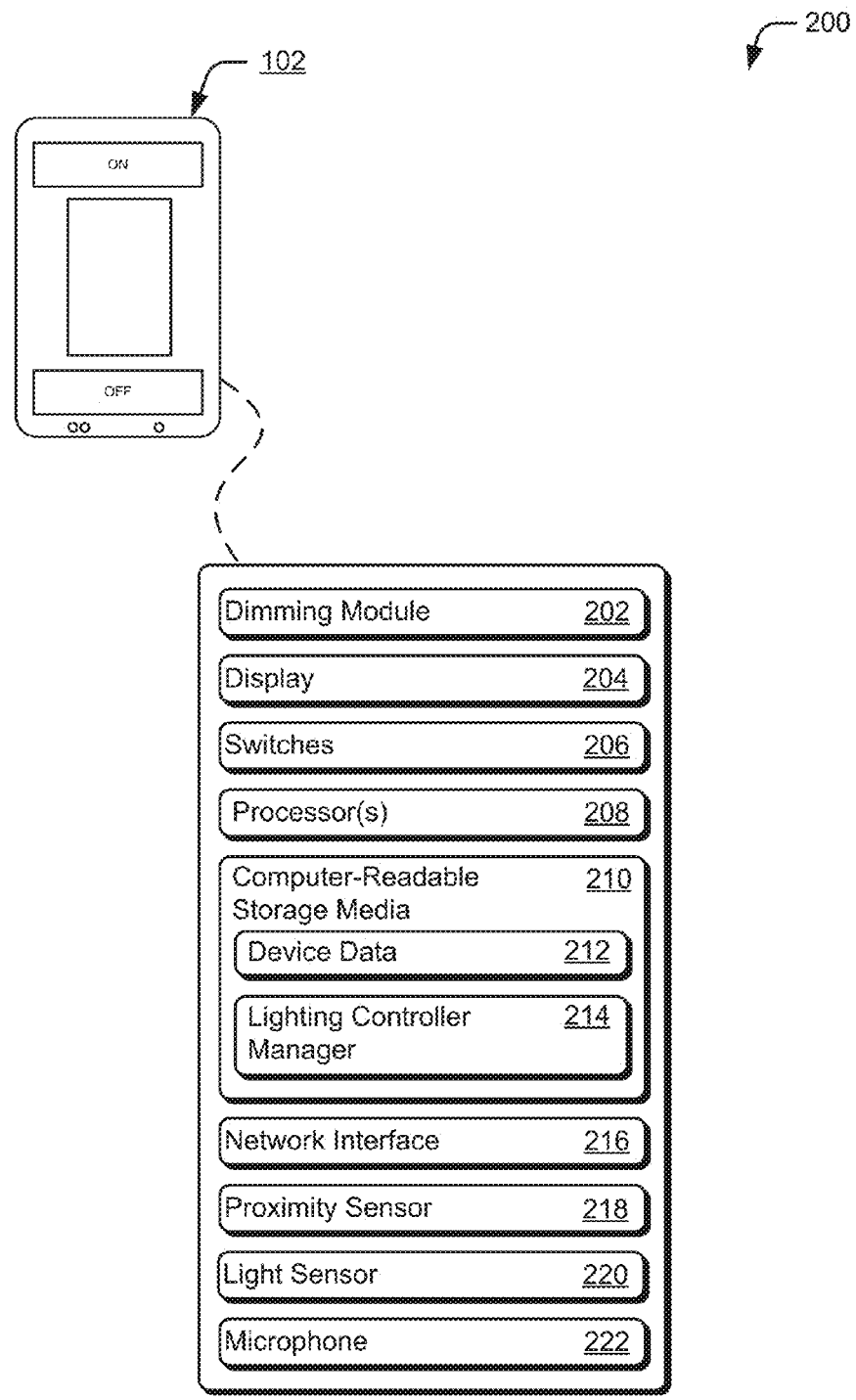
FIG. 2 illustrates an example device diagram of the customizable lighting controller in accordance with one or more aspects.

FIG. 2 illustrates an example of device diagram 200 of the customizable lighting controller 102. A dimming module 202 controls the flow of electricity provided to the lighting circuit 104 from the customizable lighting controller 102. A display 204 displays information locally to the user of the customizable lighting controller 102. The display 204 may use any suitable display, for example a color LCD display, which may include a backlight to illuminate the display 204. Switches 206 receive inputs from the user, such as switching on and off power to the lighting circuit 104, scrolling information on the display 204, selecting functions of the customizable lighting controller 102, and so forth.

The customizable lighting controller 102 also includes processor(s) 208 and computer-readable storage media 210 (CRM 210). Processor 208 may be a single core or multiple core processor composed of a variety of materials, such as silicon, polysilicon, high-K dielectric, copper, and so on. CRM 210 may include any suitable memory or storage device such as random-access memory (RAM), static RAM (SRAM), dynamic RAM (DRAM), non-volatile RAM (NVRAM), read-only memory (ROM), or Flash memory useful to store device data 212 of the customizable lighting controller 102. The device data 212 includes user data, multimedia data, applications, and/or an operating system of the customizable lighting controller 102, which are executable by processor 208 to enable user interaction with the customizable lighting controller 102.

CRM 210 also includes a lighting controller manager 214, which, in one implementation, is embodied on CRM 210 (as shown). Alternately or additionally, lighting controller manager 214 may be implemented in whole or part as hardware logic or circuitry integrated with or separate from other components of the customizable lighting controller 102 (e.g. a network interface 216). In at least some aspects, lighting controller manager 214 configures the network interface 216 for communication over networks enabling the customizable lighting controller 102 to communicate with the companion device 110 over networks. How lighting controller manager 214 is implemented and used varies and is described below.

The network interface 216 is connected to the processor 208 to connect the customizable lighting controller 102 to the local network 108. The network interface 216 is connected to an antenna when the local network 108 is a wireless network. Alternatively, when the customizable lighting controller 102 is configured to use power line networking, the network interface 216 is connected to the network 108 with a suitable power line coupler.

A proximity sensor 218 is connected to the processor 208 to determine the physical presence of a user in the vicinity of the customizable lighting controller 102. The proximity sensor 218 measures the distance and/or change in distance between the user and the customizable lighting controller 102. The proximity sensor 218 may be used by the lighting controller manager 214 to determine motion from multiple indications of proximity over time, for example to determine occupancy of a room. The proximity sensor 218 may be any suitable sensor such as an infrared (IR) proximity sensor or a thermopile proximity sensor. Proximity sensor 218 may also include a lens and/or filter assembly to control the angle of view of the sensor, for example to filter out the movement of pets, such as a dog or cat. Movement can also be filtered based on temperature or any other appropriate technique.

A light sensor 220 is connected to the processor 208 to measure ambient light in the vicinity of the customizable lighting controller 102. In response to variations in ambient light measured by the light sensor 220, the lighting controller manager 214 adjusts the level of backlight of the display 204 or uses changes in ambient light to trigger a change in a lighting level of the lighting circuit 104. For example, in a bedroom at night, the backlight would be dimmed. Additionally, a microphone 222 is connected to the processor 208 to receive audio signals from an audio speaker of the companion device 110. These audio signals are used to communicate information to the customizable lighting controller 102, such as information to configure the network interface 216 of the customizable lighting controller 102, as described below.

Figure 3:
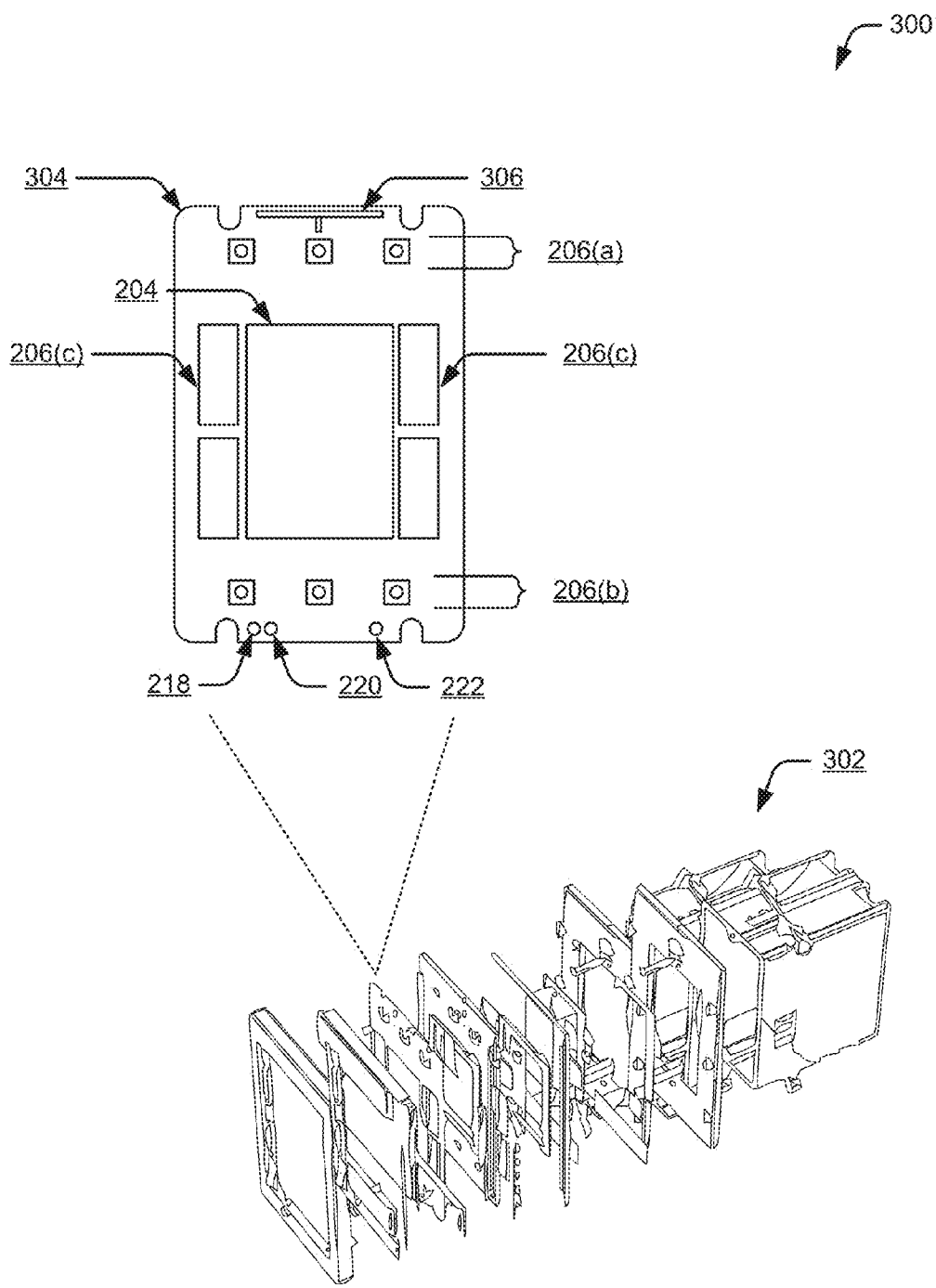
FIG. 3 illustrates an example of details of the configuration of the customizable lighting controller in accordance with one or more aspects.

FIG. 3 illustrates an example of a device diagram 300 of the customizable lighting controller 102. An assembly of the customizable lighting controller 102 is shown, at 302, to provide context for the other details illustrated in FIG. 3. An input/output assembly 304, shown in front elevation, illustrates an example relationship of the display 204, the switches 206, an antenna 306, the proximity sensor 218, the light sensor 220, and the microphone 222. The switches 206 include "on" switches 206(*a*) and "off" switches 206(*b*), which are arranged to sense a press on the front of the customizable lighting controller 102 to turn on or turn off, respectively, the lighting circuit 104. Although three switches are illustrated at 206(*a*) and 206(*b*), any appropriate number of switches of any suitable type may be used, such as electromechanical switches.

Switches 206(*c*) are adjacent to the display 204. The switches 206(*c*) may be used individually, or in combination, to interact with information displayed on the display 204. Although illustrated as two switches on each side of the display 204, the switches 206(*c*) may be placed along any side of the display 204, and any suitable number of the switches 206(*c*) may be used. The switches 206(*c*) may be any type of switches, for example capacitive switches that sense the presence of a finger of the user without requiring pressure to be applied by the finger. By using capacitive switch technology, the switches 206(*c*) and the display 204 provide similar functionality to a touchscreen display, but at lower cost.

The lighting controller manager 214 senses the switches 206(*c*) to determine if one or more touches, gestures, or movements are being made by the user. Example touches, gestures, or movements may be a swipe or a flick from one switch 206(*c*) to another switch 206(*c*), the amount of time a finger rests on one or more switches 206(*c*), and so forth. For example, the lighting controller manager 214 senses a transition from a lower switch 206(*c*) to a higher switch 206(*c*), and in response scrolls up information on the display 204. Other touches, combinations of touches, and transitions between the switches 206(*c*) are contemplated, for example to zoom information on the display, to pan as well as scroll information on the display, to make a selection related to information on the display, and the like.

Figure 4:
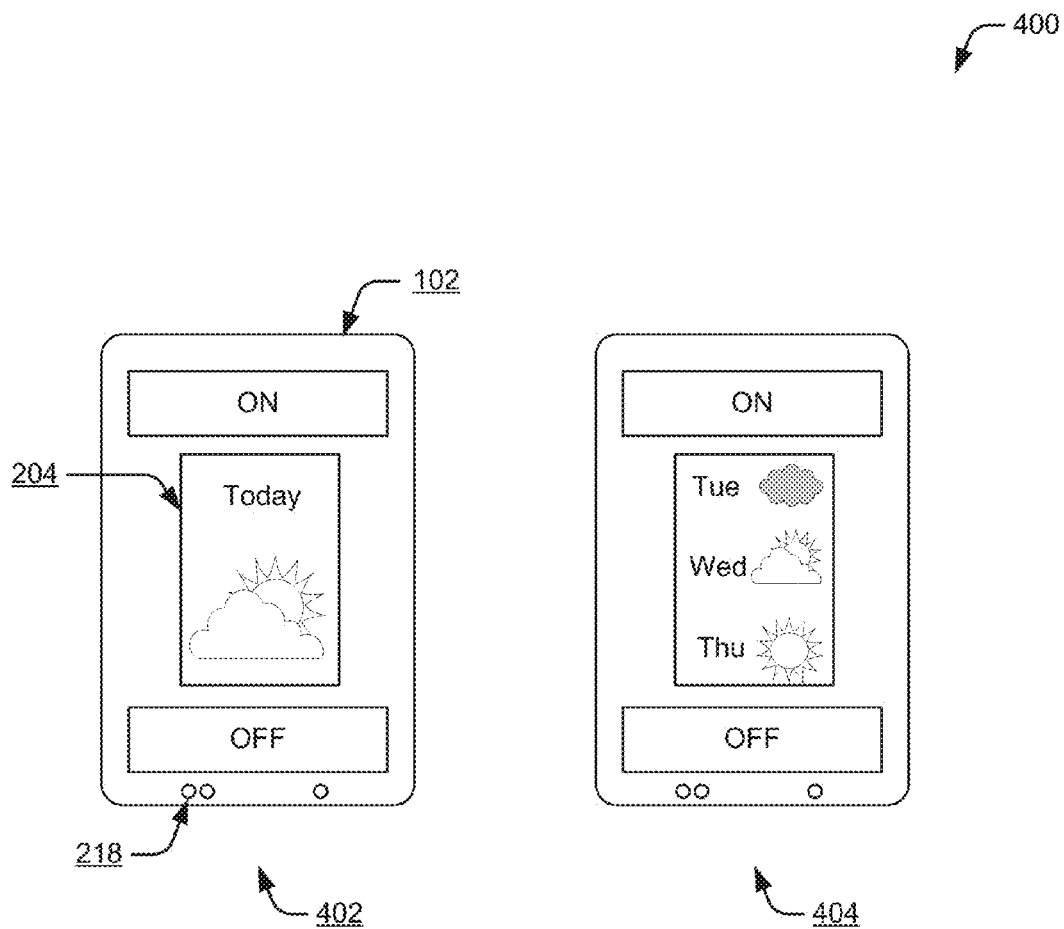
FIG. 4 illustrates configuring the display of the customizable lighting controller based on proximity in accordance with one or more aspects.

FIG. 4 illustrates configuring the display 204 based on proximity of the user in an example 400 of the customizable lighting controller 102. The display 204 presents information from applications executing on the customizable lighting controller 102. In addition to applications related to lighting control, other applications can deliver information, for example weather, sports scores, news headlines, stock prices, calendar reminders, personal messages, family photos, and/or traffic information obtained over the Internet.

The proximity sensor 218 provides an indication of whether a user is closer to, or farther away from, the customizable lighting controller 102. The lighting controller manager 214 uses the indication of distance to determine how much information to display on the display 204. When the user is farther away, the lighting controller manager 214 reduces the amount of information displayed, as shown at 402. When the user is closer, the lighting controller manager 214 increases the amount of information displayed, as shown at 404. The lighting controller manager 214 may use one or more distance thresholds, distance ranges, or any other suitable technique, to decide if the user is distant from, or near to, the customizable lighting controller 102, when determining the amount of information to display.

By sensing the distance to the user, the lighting controller manager 214 provides an appropriate level of information, based on the distance of the user. The user can configure one or more distances at which the amount of displayed information changes, for example the user may want more information to be displayed when the user is 5 feet or less away from the customizable lighting controller 102. The lighting controller manager 214 may change the information in any suitable fashion, such as by changing the scaling of the information, switching between iconic and textual presentations of information, reducing or increasing the amount of items of information displayed, and so forth.

To take fuller advantage of the customization and information capabilities of the customizable lighting controller 102, a network connection provides not only remote capability, but also enables applications executing on the customizable lighting controller 102 to obtain information over the network, such as from sites on the Internet.

For example, a user may personalize the appearance of the customizable lighting controller 102 by sending one or more images and/or messages from the companion device 110 to the customizable lighting controller 102. The lighting controller manager 214 displays a received image on the display 204. When the customizable lighting controller 102 receives multiple images, the lighting controller manager 214 animates transitions between the multiple received images. The animation effects may be configured by the user. For example, the user may configure the lighting controller manager 214 to control various aspects of the animation, such as transition speed, the amount of time to display each image, the type of transition effect (dissolve, pan, scroll, etc.), and the like.

The user may also schedule images to display based on one or more of a time of day, a day of the week, a calendar event, a selected lighting level or scene, a change in ambient light sensed by light sensor 220, motion and/or proximity sensed by proximity sensor 218, and such. For example, the user may select images that complement the décor of the room where the switch is located, or schedule a display of a birthday greeting in the room of a child on her birthday.

The limited amount of space on a light switch for both displaying information and inputting information can make various tasks, such as setting lighting schedules or configuring the customizable lighting controller 102, challenging for the user. Using the companion device 110 to perform these types of tasks improves usability for the user. For example, the companion device 110 is used to configure the customizable lighting controller 102 to join a network, such as a Wi-Fi network. The companion device 110 is connected to network 108 and contains the required network information and/or credentials. For example in the case of Wi-Fi, an SSID of the network, a type of security used by the network, and/or a password. The companion device 110 can provide the network information to the customizable lighting controller 102.

Figure 5:
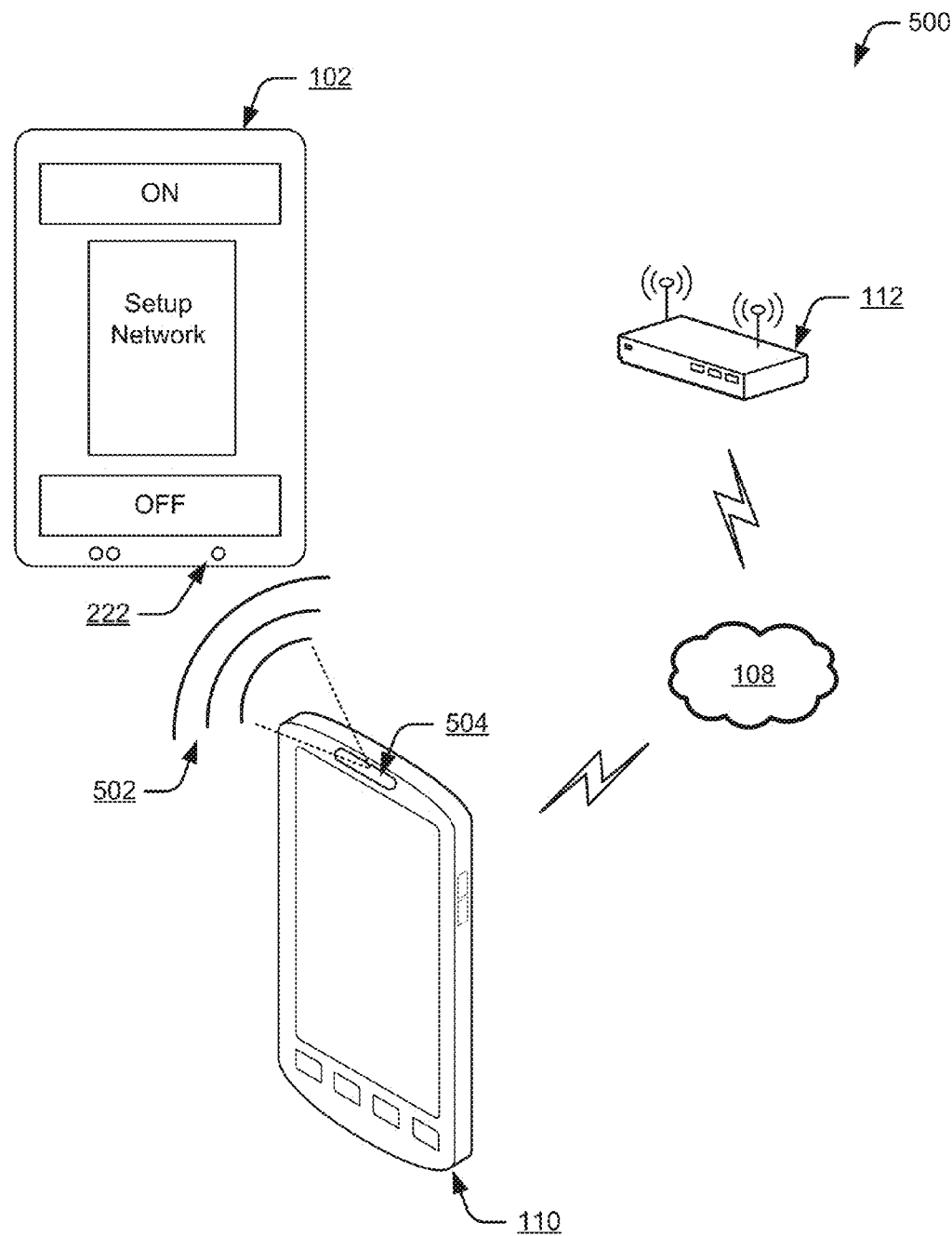
FIG. 5 illustrates an example of configuring the network settings of the customizable lighting controller in accordance with one or more aspects.

FIG. 5 illustrates an example of configuration environment 500 of the customizable lighting controller 102. By using the network information contained in the companion device 110, the process of setting up the network connection for the customizable lighting controller 102 can be simplified. The companion device 110 converts the network information from a textual format in which it is stored on the companion device 110 and encodes the network information into a series of audio signals 502. The companion device 110 outputs the series of audio signals 502 from an audio speaker 504 of the companion device 110. The series of audio signals are received at the microphone 222 of the customizable lighting controller 102. The lighting controller manager 214 decodes the received audio signals 502 to produce the textual version of the network information. The lighting controller manager 214 uses the decoded network information to join the local network 108 using any suitable protocol supported by the local network 108 and the local network router 112.

The encoding of the network information into a series of audio signals may be performed in any suitable manner. For example, individual characters of text may be directly converted to audio signals, or bits in ASCII representations of each character may be converted or modulated to form the audio signal. The encoding of the network information may be performed with any one or combination of techniques such as variations in amplitude, frequency, and/or phase of the audio signal in correspondence to the text or the bits of the text in the network information. Likewise, the lighting controller manager 214 decodes the audio signal by reversing the encoding process to decode and generate a textual version of the network information. Although described here with respect to configuring network information, this technique can be used to communicate any type of suitable information to the customizable lighting controller 102.

Once the configurable lighting controller 102 is connected to the network 108, the companion device 110 may be used to remotely control the configurable lighting controller 102. For example, an application on the companion device 110 may display a floor plan of a house in which the configurable lighting controller 102 (or multiple configurable lighting controllers 102) is installed. The user may select a specific customizable lighting controller 102 to control. The user may then set a lighting level, program a schedule for lighting levels, or otherwise configure the customizable lighting controller 102.

The user may also use the companion device 110 to program lighting schedules for the customizable lighting controller 102. A more extensive user interface of the companion device 110 provides a richer and more flexible interface for programming the customizable lighting controller 102. The user may program one or more schedules based on days of the week, time of day, triggered from sunrise or sunset, to include randomization in on/off times to improve security, and so forth. For example, triggering relative to sunset and/or sunrise can be configured by the user based on a geographic location configured in the customizable lighting controller 102 to be used in combination with date and time, based on ambient light sensed by the light sensor 220, based on information retrieved by the lighting controller manager 214 over the Internet, or any suitable combination of factors.

When the user travels away from home, companion device 110 connects to the customizable lighting controller 102 through the wide area network 114. The application on the companion device 110 controls the customizable lighting controller 102 over the wide area network 114 in the same way as the application does when the companion device 110 is connected over the local network 108. Communication between the customizable lighting controller 102 and the companion device 110 may use any suitable communication protocol, such as XMPP, WebSockets, and the like. Security and/or authentication for these network communications can be provided by using any suitable technique, such as username and password, certificate authentication, and the like.

The customizable lighting controller 102 provides additional capabilities when the user is away. For example, the proximity sensor 218 senses presence and/or motion to determine occupancy. The lighting controller manager 214 communicates the detection to the companion device 110 to provide an alert to the user so that the user can determine if there may be a trespasser, if children arrived home from school on schedule, and the like. In another example, the companion device 110 uses geofencing to determine that the user is approaching home. The companion device 110 communicates with the customizable lighting controller 102 to turn lights on before the user arrives at home.

The lighting controller manager 214 executes one or more applications that may display information on the display 204. The user may use the companion device 110 to select which applications to execute, to schedule when applications execute and/or display information, to select applications to download to the customizable lighting controller 102, and so forth. Alternatively, the user may perform these tasks directly on the user interface of the customizable lighting controller 102 using the display 204 and the switches 206.

Applications for the customizable lighting controller 102 are written in a lightweight programming language, such as Javascript. The applications may be included with the customizable lighting controller 102 when it is purchased by a consumer or downloaded later to the customizable lighting controller 102. The amount of information displayed by the applications is increased and/or decreased by the lighting controller manager 214, based on proximity of the user, as described above and illustrated in FIG. 4.

For example, a user may schedule several applications to display information on the customizable lighting controller 102 installed in a bedroom on weekday mornings. The user chooses to schedule applications that display weather and traffic information on weekday mornings, during a period of time when the user wakes and is getting ready to leave for work. The applications download relevant information over the Internet. The lighting controller manager 214 transitions through displaying information from the applications based on settings configured by the user. The proximity sensor 218 senses that the user is still in bed, either based on distance from the switch or lack of motion, and the amount of information displayed by the applications is reduced. The reduced amount of information improves viewability for the user still in bed across the room. After the user wakes and moves closer to the customizable lighting controller 102, the lighting controller manager 214 displays an increased amount of information to provide greater detail to the user.

Techniques for Customizable Lighting Controller

The following discussion describes techniques for the customizable lighting controller. These techniques can be implemented using the previously described environments or entities, such as the lighting controller manager 214 of FIG. 2 embodied on a customizable lighting controller 102. These techniques include methods illustrated in FIGS. 6-9, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of device environment 200 of FIG. 2 by way of example. Such reference is not to be taken as limited to operating environment 100 but rather as illustrative of one of a variety of examples.

Figure 6:
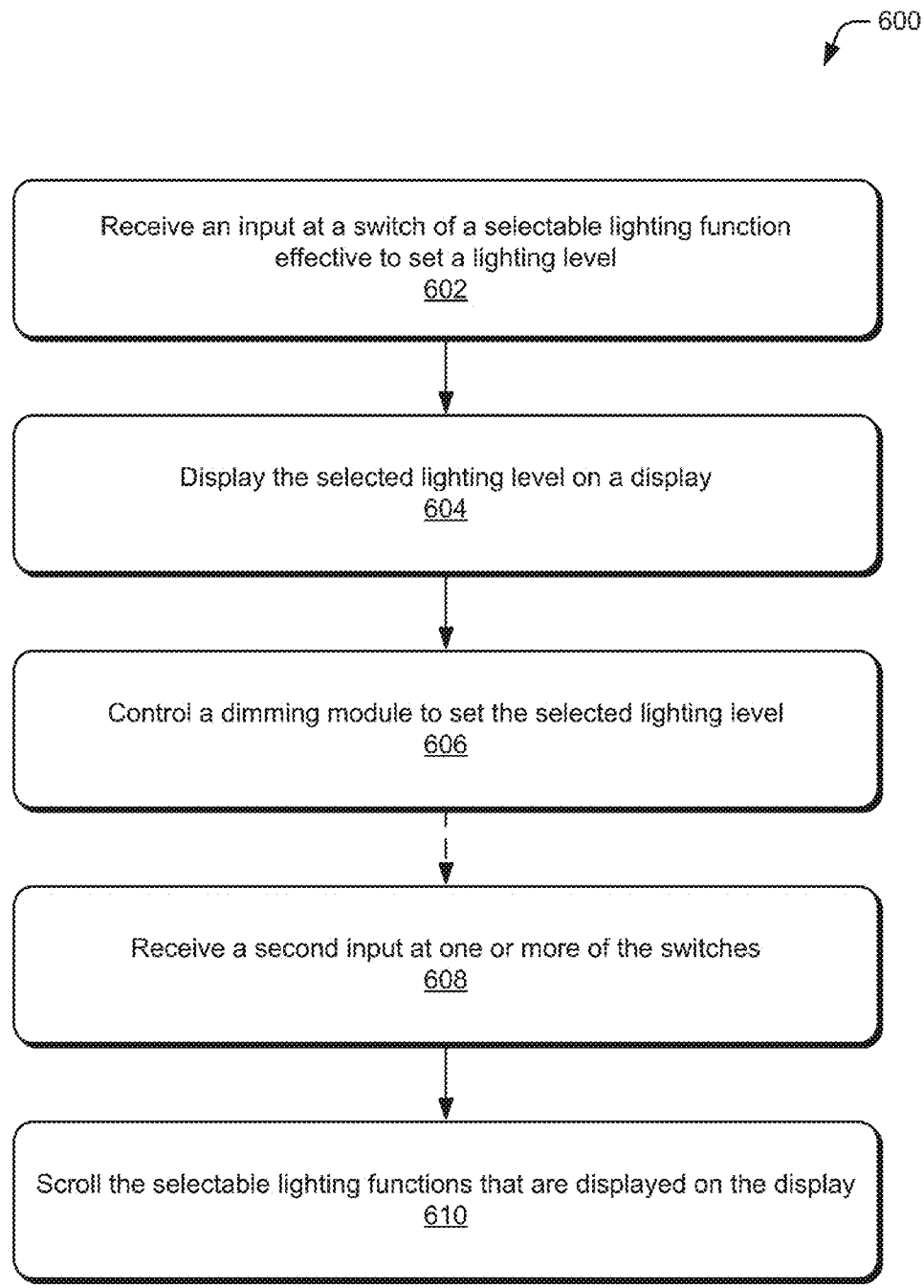
FIG. 6 illustrates a method of setting lighting levels in accordance with one or more aspects.

FIG. 6 depicts a method 600 of configuring the customizable lighting controller 102, including operations performed by the lighting control manager 214 of FIG. 2. At 602, an input is received at a switch corresponding to the selection of a selectable lighting function. The selectable function sets a lighting level. By way of example, a user makes a selection using one of the switches 206 to select a lighting function. An indication of the selection is received by the lighting controller manager 214. The selection may correspond to a dedicated lighting function, such as "on" or "off" switches on the face of the customizable lighting controller 106 or a selection corresponding to a lighting function that is displayed on the display 204.

At 604, the selected lighting level is displayed on a display of the lighting controller. For example, the lighting controller manager 214 initiates display of the selected lighting level on the display 204.

At 606, the lighting controller manager controls a dimming module to set the selected lighting level. For example, the lighting controller manager 214 controls the dimming module 202 to set the selected level, effective to cause the dimming module 202 to adjust the flow of electricity to the lighting circuit 104 to provide the desired level of light. The lighting controller manager 214 may control the dimming module 202 in any suitable manner, such as providing a control voltage or current to the dimming module 202, by writing a value to a register in the dimming module 202 that corresponds to the selected lighting level, and such, to set the selected lighting level.

Optionally at 608, a second input is received at one or more of the switches. For example, the second input is received at one or more switches 206. The lighting controller manager 214 receives an indication of the second input. The lighting controller manager 214 determines from the indication that the input corresponds to a selection by the user to scroll the information displayed on the display 204. The second input may be the selection of a single switch 206(c), or a gesture, such as a swipe, that starts on a first switch 206(c) and transitions to a second switch 206(c). The lighting controller manager 214 determines that the user wants to scroll the information, as well as determining the direction to scroll the information, on the display.

At 610, the selectable lighting functions that are displayed are scrolled on the display. For example, the lighting controller manager 214 sends updated display information effective to provide a series of updates to the display 204 that are effective to scroll the information on the display 204.

Figure 7:
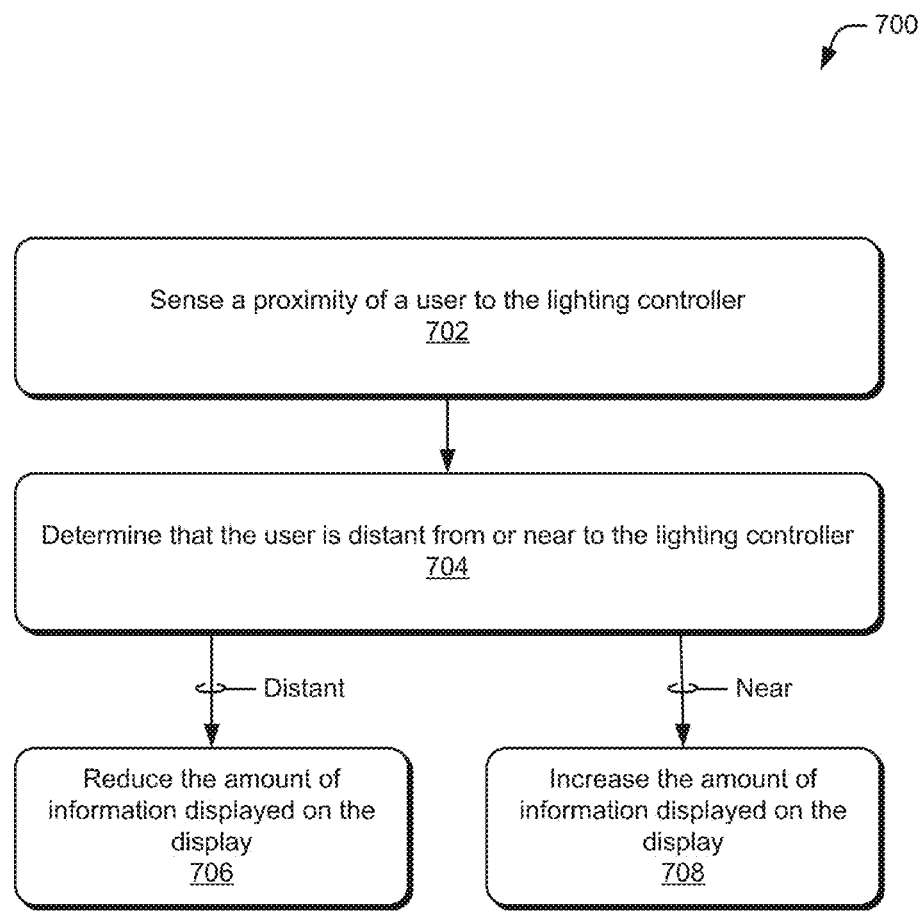
FIG. 7 illustrates a method of displaying information based on proximity in accordance with one or more aspects.

FIG. 7 depicts a method 700 of configuring the customizable lighting controller 102, including operations performed by the lighting control manager 214 of FIG. 2. At 702, a proximity sensor senses proximity of a user to a lighting controller. By way of example, the proximity sensor 218 provides an indication of the proximity of the user to the lighting controller manager 214.

At 704, a lighting controller manager determines whether the user is distant from, or near to, the lighting controller. For example, the lighting controller manager 214 receives the sensed proximity from the proximity sensor 218 that indicates a distance of the user from the customizable lighting controller 102. The lighting controller manager 214 compares the indicated distance to one or more thresholds to determine that the user is distant from, or near to, the customizable lighting controller 102. The thresholds may be preset or configurable by the user to tailor the distance or range of distances used in the determination of an amount of information to display, which may be based on the installation location or specific user needs.

At 706, in response to determining that the user is distant from the lighting controller, the lighting controller manager reduces the amount of information displayed on the display. For example, the lighting controller manager 214 sends less information, displayed at a relatively larger scale, to the display 204 for display.

At 708, in response to determining that the user is near to the lighting controller, the lighting controller manager increases the amount of information displayed on the display. For example, the lighting controller manager 214 sends more information, displayed at a relatively smaller scale, to the display 204 for display.

Figure 8:
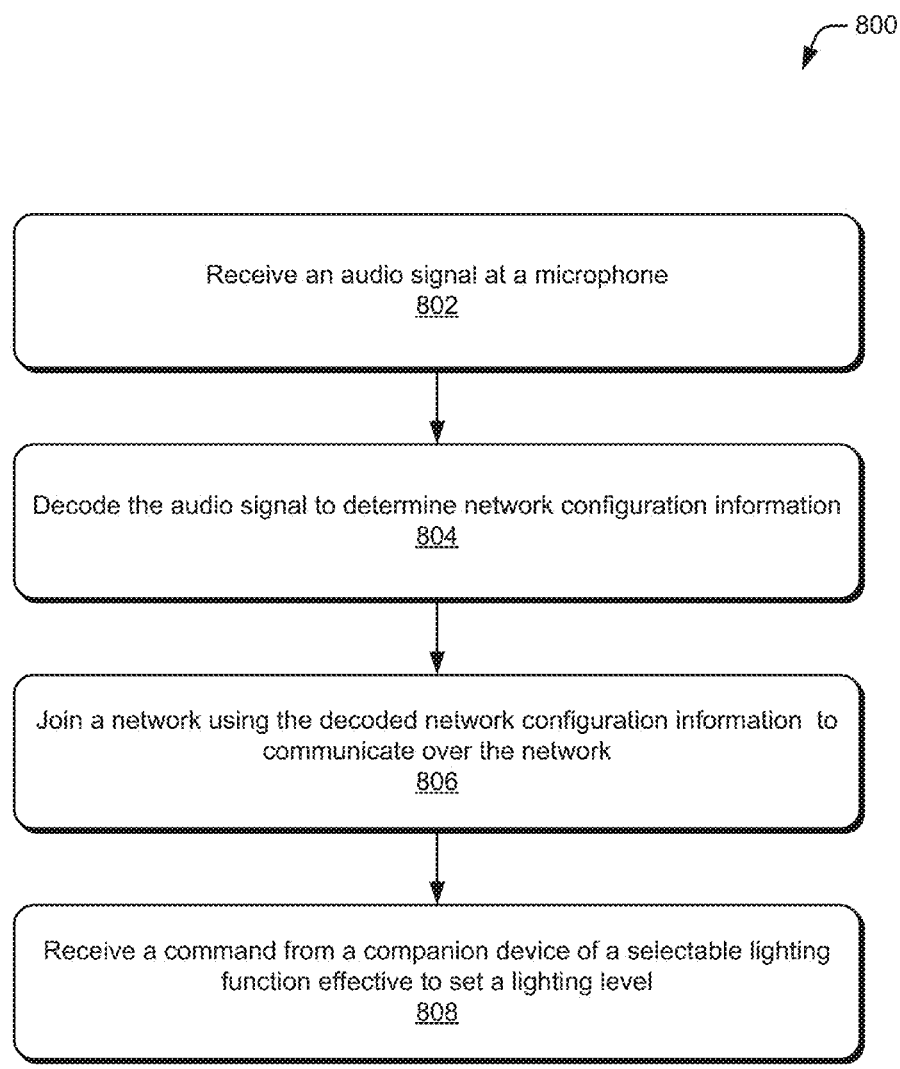
FIG. 8 illustrates a method of configuring network connections in accordance with one or more aspects.

FIG. 8 depicts a method 800 of configuring the customizable lighting controller 102, including operations performed by the lighting control manager 214 of FIG. 2. At 802, an audio signal is received at a microphone of a lighting controller. By way of example, the microphone 222 receives the audio signal 502 output by the audio speaker 504 of the companion device 110. The companion device 110 encodes network configuration information from text into the audio signal 502.

At 804, a lighting controller manager decodes the audio signal to determine the network configuration information. For example, the lighting controller manager 214 processes the audio signal received by the microphone 222 to decode the audio signal and produce a textual version of the network information that was encoded by the companion device 110.

At 806, the lighting controller manager configures a network interface to join a network using the decoded network configuration information and communicate over the network. For example, the lighting controller manager 214 uses the decoded network information to configure the network interface 216, to cause the network interface 216 to communicate with the local network router 112, using the appropriate protocols to join the customizable lighting controller 102 to the local network 108. For example, the lighting controller manager 214 may further instantiate or enable network interfaces or protocols, to communicate with the companion device 110, retrieve information over the Internet for applications executing on the customizable lighting controller 102, and so forth.

At 808, the lighting controller manager receives a command from the companion device for a selectable lighting function that is effective to set a lighting level. For example, the lighting controller manager 214 receives a command from the companion device 110 over the local network 108. The lighting controller manager 214 processes the received command to determine the corresponding lighting function for the received command. The lighting controller manager 214 performs the corresponding command to set the lighting level, which may include using values of parameters received in the command from the companion device 110. The lighting controller manager 214, as previously described, controls the dimming module to set the selected lighting level.

Figure 9:
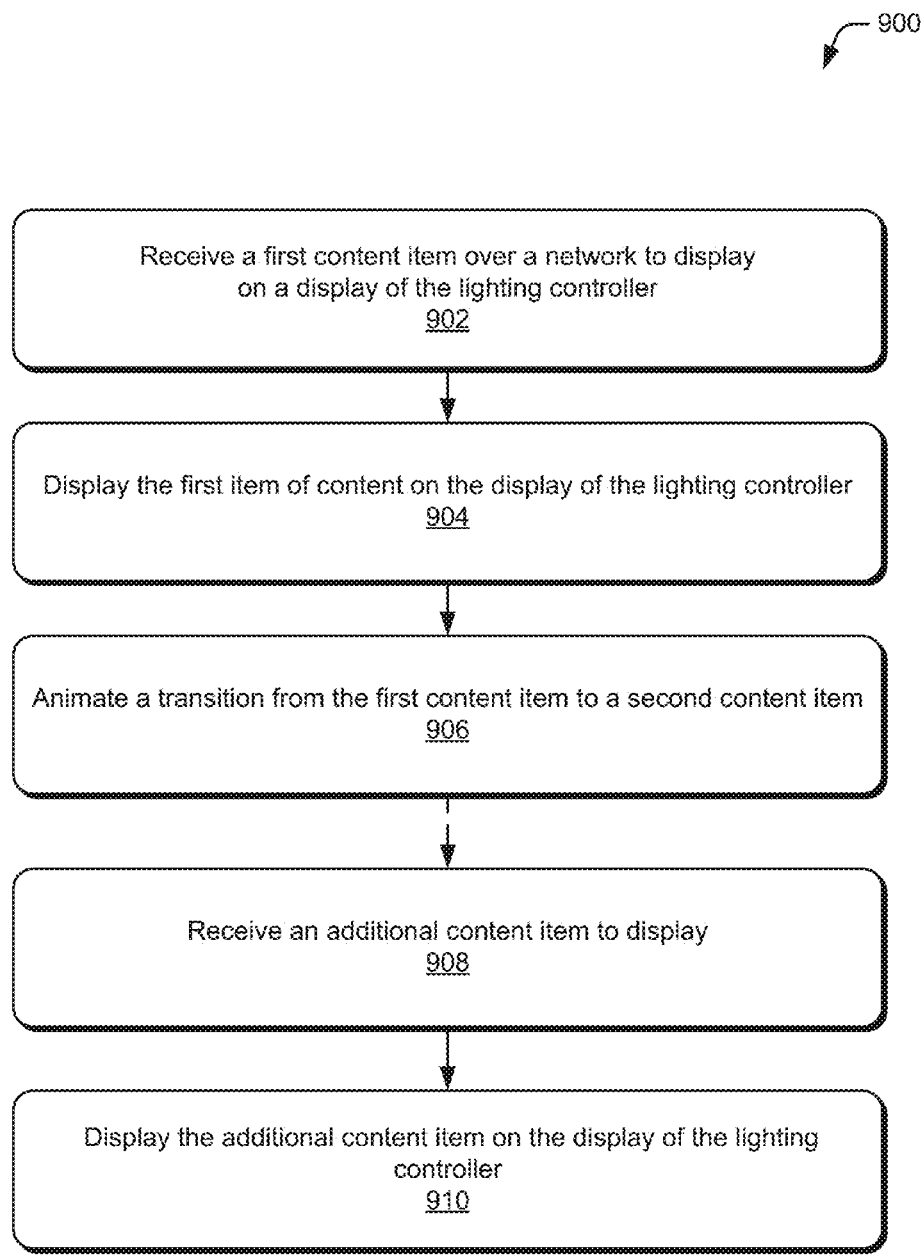
FIG. 9 illustrates a method of displaying content in accordance with one or more aspects.

FIG. 9 depicts a method 900 of configuring the customizable lighting controller 102, including operations performed by the lighting control manager 214 of FIG. 2. At 902, the lighting controller receives a first content item to display. By way of example, a user sends a photograph from the companion device 110 to the customizable lighting controller 102. The lighting controller manager 214 stores the received photograph in the device data 212 memory.

At 904, the lighting controller manager displays a first content item on the display of the lighting controller. For example, the lighting controller manager 214 initiates display of the received photograph on the display 204. Displaying the photograph may include any processing, such as scaling the resolution of the received photograph, required for the received photograph to be properly displayed on the display 204.

At 906, the lighting controller manager animates a transition from the first received content item to a second content item. For example, the lighting controller manager 214 animates a transition from displaying the received photograph to displaying a second image on the display 204. The transition can be animated in any suitable way, such as dissolving, scrolling, panning, or switching between images.

Optionally at 908, the lighting controller receives additional content to display. For example, the user sends a new photograph to the customizable lighting controller 102. The lighting controller manager 214 stores the newly received photograph in the device data 212 memory.

At 910, the lighting controller manager animates a transition to display the additional content item on the display of the lighting controller. For example, the lighting controller manager 214 animates a transition from a currently displayed image on the display 204 to display the newly received image on the display 204.

System-on-Chip

Figure 10:
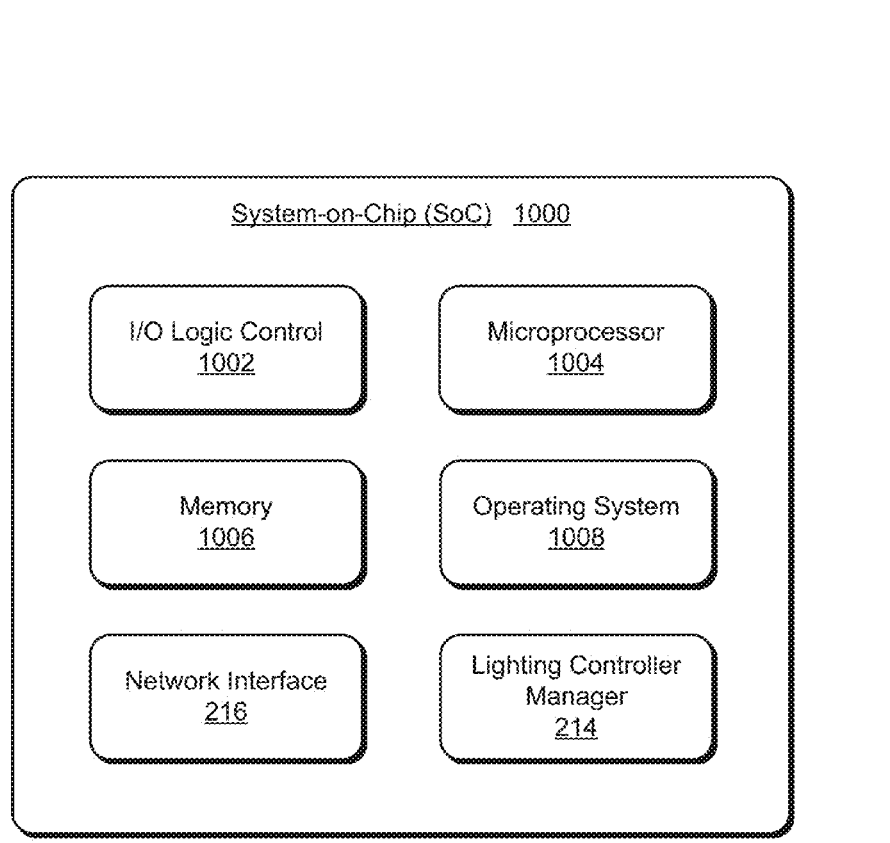
FIG. 10 illustrates a System-on-Chip (SoC) environment for implementing aspects of the techniques described herein.

FIG. 10 illustrates a System-on-Chip (SoC) 1000, which can implement various aspects of the customizable lighting controller as described above. A SoC can be implemented in any suitable device, such as a video game console, IP-enabled television, smartphone, desktop computer, laptop computer, remote control, tablet computer, server, network-enabled printer, set-top box, wireless network card, radio module, USB dongle, and/or any other type of device that may communicate over wireless and/or power line networks.

SoC 1000 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 1000 can also include an integrated data bus or crossbar (not shown) that couples the various components of the SoC for data communication between the components. A lighting controller device that includes SoC 1000 can also be implemented with many combinations of differing components. In some cases, these differing components may be configured to implement concepts described herein over various types of wireless connections.

In this example, SoC 1000 includes various components such as an input-output (I/O) logic control 1002 (e.g., to include electronic circuitry) and a microprocessor 1004 (e.g., any of a microcontroller or digital signal processor). SoC 1000 also includes a memory 1006, which can be any type of RAM, low-latency nonvolatile memory (e.g., Flash memory), ROM, and/or other suitable electronic data storage. SoC 1000 can also include various firmware and/or software, such as an operating system 1008, which can be computer-executable instructions maintained by memory 1006 and executed by microprocessor 1004. SoC 1000 can also include other various communication interfaces and components, communication components, other hardware, firmware, and/or software.

SoC 1000 includes network interface 216 and lighting controller manager 214 (embodied as disparate or combined components as noted above). Examples of these various components, functions, and/or entities, and their corresponding functionality, are described with reference to the respective components of the environment 200 shown in FIG. 2.

Lighting controller manager 214, either independently or in combination with other entities, can be implemented as computer-executable instructions maintained by memory 1006 and executed by microprocessor 1004 to implement various embodiments and/or features described herein. Lighting controller manager 214 may also be provided integral with other entities of the SoC, such as integrated with one or both of I/O logic controller 1002 or any network interface within, or associated with, SoC 1000. Alternatively or additionally, lighting controller manager 214 and the other components can be implemented as hardware, firmware, fixed logic circuitry, or any combination thereof that is implemented in connection with the I/O logic control 1002 and/or other signal processing and control circuits of SoC 1000.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A lighting controller configured to set a lighting level of a light, the lighting controller comprising:
    a display device configured to display a plurality of selectable lighting functions;
    a proximity sensor configured to sense a proximity of a user to the lighting controller;
    a processor and memory system to implement a lighting controller manager, wherein the lighting control manager is configured to:
        receive an input of a first selectable lighting function of the plurality of selectable lighting functions;
        initiate a display, on the display device, of the lighting level selected by the input;
        determine a distance of the user from the lighting controller based on the sensed proximity; and
        reduce an amount of information that is displayed on the display device based on a determination that the determined distance of the user is greater than a distance threshold; or
        increase the amount of information that is displayed on the display device based on a determination that the determined distance of the user is less than the distance threshold.

2. A method, comprising:
    receiving, at a microphone of a lighting controller, an audio signal emitted from an audio speaker of a companion device;
    decoding the audio signal to determine network configuration information;
    joining a network using the decoded network configuration information to configure the lighting controller for control by the companion device over the network;
    receiving a command from the companion device, via the network, the command effective to set a lighting level of a light; and
    controlling a dimming module to set the light to the lighting level in the received command.

3. A system, comprising:
    a display device configured to display a plurality of selectable lighting functions;

a network interface;
a lighting controller manager, wherein the lighting control manager is configured to:
  initiate a display, on the display device, of a lighting level selected by an input;
  receive content items for display on the display device, the received content items comprising at least one of: images sent from a companion device, weather information, stock information, and news; and
  animate transitions between the content items that are displayed on the display device.

4. The lighting controller of claim 1, further comprising:
a plurality of switches each corresponding to a selectable lighting function of the plurality of selectable lighting functions; and
the lighting control manager is configured to:
  receive an input of a first selectable lighting function of the plurality of selectable lighting functions at a switch corresponding to the first selectable lighting function effective to select the lighting level for the light; and
  control a dimming module to set the light to the lighting level selected by the input.

5. The system of claim 3, further comprising:
a plurality of switches each corresponding to a selectable lighting function of the plurality of selectable lighting functions; and
the lighting control manager is configured to:
  receive an input of a first selectable lighting function of the plurality of selectable lighting functions at a switch corresponding to the first selectable lighting function effective to select the lighting level for the light; and
  control a dimming module to set the light to the lighting level selected by the input.

6. The method of claim 2, further comprising:
displaying a plurality of selectable lighting functions on a display of the lighting controller;
receiving an input of a selectable lighting function at one of a plurality of switches of the lighting controller, effective to select the lighting level for the light, wherein each switch of the plurality of switches corresponds to a selectable lighting function of the plurality of selectable lighting functions;
initiating the display of the lighting level selected by the input on the display of the lighting controller; and
controlling the dimming module to set the light to the lighting level selected by the input.

7. The lighting controller of claim 4, wherein the lighting controller manager is further configured to:
receive an additional input at another switch of the plurality of switches; and
initiate scrolling the selectable lighting functions that are displayed on the display device.

8. The lighting controller of claim 1, further comprising:
a network interface; and
the lighting controller manager is configured to receive a command via the network interface from a companion device, the command effective to set the lighting level.

9. The lighting controller of claim 8, further comprising:
a microphone configured to receive an audio signal emitted from an audio speaker of the companion device;
the lighting controller manager is configured to:
  decode the audio signal to determine network configuration information; and
  join a network using the decoded network configuration information to configure the lighting controller for control by the companion device over the network.

10. The lighting controller of claim 9, wherein the companion device includes the network configuration information and is configured to encode the network configuration information into the audio signal that is emitted from the audio speaker of the companion device.

11. The lighting controller of claim 8, wherein the lighting controller manager is configured to:
receive content for display on the display device; and
animate transitions between the content that is displayed on the display device.

12. The lighting controller of claim 11, wherein the received content comprises at least one of: images sent from the companion device, weather information, stock information, and news.

13. The method of claim 6, further comprising:
receiving an additional input at another switch of the plurality of switches; and
initiating scrolling the selectable lighting functions that are displayed on the display.

14. The method of claim 2, further comprising:
sensing a proximity of a user to the lighting controller;
determining a distance of the user from the lighting controller based on the sensed proximity; and
reducing an amount of information that is displayed on the display based on a determination that the determined distance of the user is greater than a distance threshold; or
increasing the amount of information that is displayed on the display based on a determination that the determined distance of the user is less than the distance threshold.

15. The method of claim 2, wherein the companion device includes the network configuration information and is configured to encode the network configuration information into the audio signal that is emitted from the audio speaker of the companion device.

16. The method of claim 6, further comprising:
receiving content for display on the display; and
animating transitions between the content that is displayed on the display.

17. The method of claim 16, wherein the received content comprises at least one of: images sent from the companion device, weather information, stock information, and news.

18. The system of claim 5, wherein the lighting controller manager is further configured to:
receive an additional input at another switch of the plurality of switches; and
initiate scrolling the selectable lighting functions that are displayed on the display device.

19. The system of claim 3, wherein the lighting controller manager is configured to receive a command via the network interface from the companion device, the command effective to set the lighting level.

20. The system of claim 3, further comprising:
a proximity sensor configured to sense a proximity of a user to the lighting controller; and wherein
the lighting control manager is configured to:
  determine a distance of the user from the lighting controller based on the sensed proximity; and
  reduce an amount of information that is displayed on the display device based on a determination that the determined distance of the user is greater than a distance threshold; or increase the amount of information that is displayed on the display device based on a determination that the determined distance of the user is less than the distance threshold.

21. The system of claim 3, further comprising:

a microphone configured to receive an audio signal emitted from an audio speaker of the companion device; and wherein the lighting controller manager is configured to:

decode the audio signal to determine network configuration information; and configure the network interface to join a network using the decoded network configuration information to configure the lighting controller for control by the companion device over the network.

* * * * *